July 15, 1969
H. G. HENRICKSON
3,455,584
PIPE COUPLER DEVICE
Filed Nov. 25, 1966
2 Sheets-Sheet 1
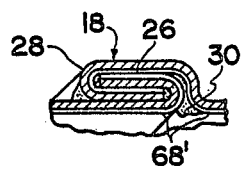
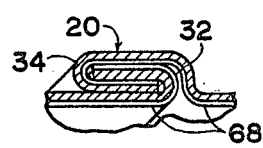
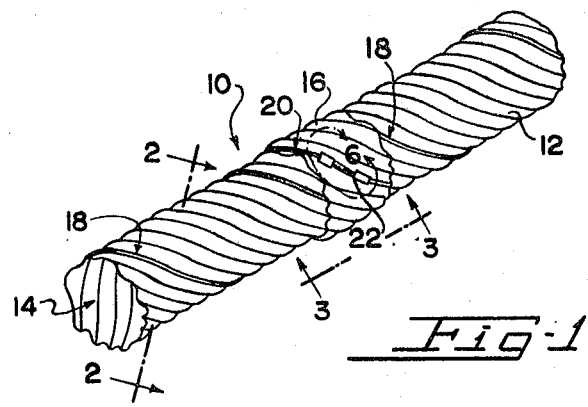
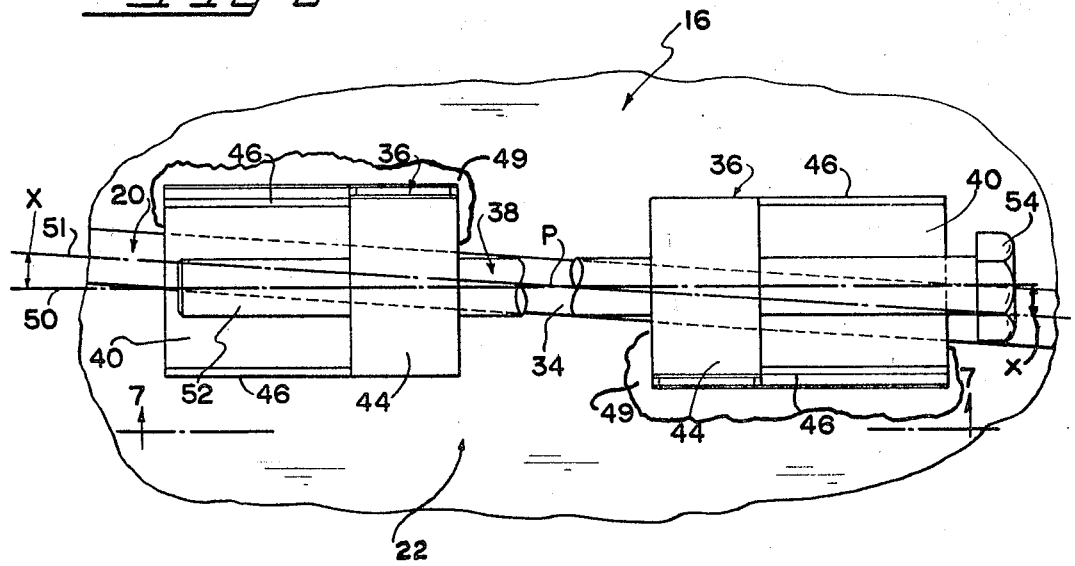
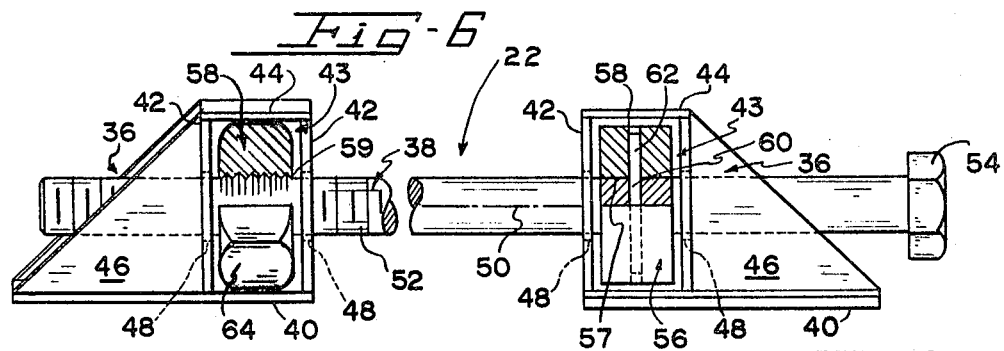
INVENTOR.
HENRY G. HENRICKSON
BY James E. Toomey
ATTORNEY INVENTOR.
HENRY G. HENRICKSON
BY James E. Eomey
ATTORNEY

United States Patent Office 3,455,584
Patented July 15, 1969

3,455,584
PIPE COUPLER DEVICE
Henry G. Henrickson, San Leandro, Calif., assignor to Kaiser Aluminum & Chemical Corporation, Oakland, Calif., a corporation of Delaware
Filed Nov. 25, 1966, Ser. No. 596,923
Int. Cl. F16l 33/00, 37/00, 41/00
U.S. Cl. 285—373                                    10 Claims

ABSTRACT OF THE DISCLOSURE

A device for splicing the adjoining ends of a pair of pipe elements or the like together by means of a split coupler band provided with improved means for drawing the band tightly about the pipe elements.

---

This invention relates to adjustable coupling devices. More particularly, it is concerned with providing an improved adjustable coupler band for joining sections of pipe or like elements together, such as culvert pipe sections, wherein an improved and highly efficient clamping device can likewise be employed to expand and contract the coupler band. Proper manipulation of the clamping device produces an effective clamping of the band about a pair of culvert pipe sections enclosed within the band and a joinder of the culvert pipe sections together.

Prior art culvert pipe coupler bands and particularly those used for joining helically corrugated culvert drain pipe sections together have not always been completely satisfactory for one or more reasons. Some of the previously developed coupler bands used with culvert drain pipe required complex yet inefficient fittings which failed to properly match or mate with the helical corrugations of the culvert sections due to the complex surface configurations generated by such sections. Other coupler bands were not soil-proof in that they failed to satisfactorily retard the passage of soil into and through the joint between the coupler band and the culvert sections locked thereto. For example, when coupled bands and culvert sections were embedded in the earth, the soil surrounding culvert joints during rainstorms would frequently erode and seep through cracks occurring between the inner surface of the coupler bands and the outer surfaces of the culvert sections to be carried away by the water flowing through the culvert drain. This has been a particularly acute problem when joined together sections of culvert drain pipe were installed in very sandy soils. The net result was that these deficient coupler bands tended to accelerate rather than minimize soil erosion at the point of junctures between adjacent culvert pipe sections.

Accordingly, it is a primary purpose of the instant invention to provide a relatively inexpensive, yet highly efficient, improved adjustable coupler of the split band type for joining together adjoining culvert pipe sections and, in particular, helically corrugated culvert pipe sections, wherein the coupler is further provided with an improved clamping device for adjusting the mating edges of the band relative to each other so as to collapse the coupler band about and lap the band with a pair of culvert pipe sections enclosed within the coupler band in order to effect, among other things, a reliable, soil-proof joint therebetween.

This and other purposes and advantages of the instant invention will become more apparent from a review of the following detailed description when taken in conjunction with the appended drawings, wherein:

FIG. 1 is a perspective view of a pair of helically corrugated culvert pipe sections joined together by the adjustable coupler band of the instant invention;

FIG. 2 is an enlarged partial sectional view generally taken along line 2—2 of FIG. 1 and illustrates certain details of the helical seam of one of the culvert pipe sections of FIG. 1;

FIG. 5 is an enlarged partial sectional view of the coupler band seam when taken generally along line 5—5 of FIG. 3 and with parts added;

Figure 1A:
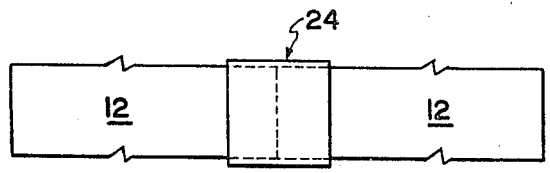
FIG. 1A is a somewhat reduced diagrammatic and plan view of the joined culvert sections of FIG. 1 with parts removed and other parts broken away and illustrates further details of the instant invention.

FIG. 6 is an enlarged fragmentary plan view of the clamping device for the coupler band taken within the limits of circumscribing line 6 of FIG. 1, rotated somewhat counterclockwise, and with parts removed and wherein for the sake of illustration the various elements shown are projected in a single plane; and FIG. 7 is a broken elevational view generally taken along line 7—7 of FIG. 6 with parts omitted for the sake of clarity.

With further reference to the drawings and in particular FIG. 1, a preferred embodiment of the invention contemplates that the improved adjustable coupler band be used with a given length of culvert drain pipe 10 made up of a pair of helically wound and corrugated individual pipe sections 12 provided with a hollow interior 14. The coupler band 16 provided with a central opening 17, also preferably made in the form of a short section of helically wound and corrugated pipe, engages and fully encompasses the opposing ends of the pipe sections 12.

The individual pipe sections 12 can be fabricated from a legnth of metal strip, e.g., aluminum or aluminum alloy strip, which is corrugated, and then helically wrapped in such a fashion that the edges making up the helical wrap are lock-seamed together in a continuous fashion by means of readily available equipment such as, for example, that shown in United States Patent 2,136,942, issued to Jonathan Ray Freeze on Nov. 15, 1938. During manufacture and subsequent to seaming, the helically wound and corrugated strip is cut into sections 12 of convenient lengths.

The longitudinal edges of the helically wrapped metal strip are lock-seamed together by a helical seam 18 made up of overlapping and folded portions of the opposing strip edges and it extends for the entire length of a culvert secion 12. In a preferred embodiment of the invention, the coupler band 16 is cut from helically seamed and corrugated metal stock manufactured in the same fashion as sections 12 but with a slightly larger diameter and a suitable clamping device then applied thereto or band 16 can be cut from the same finished, helically wound and corrugated metal stock as the individual culvert pipe sections 12 while being of a shorter length than a culvert section 12. This practice has several advantages. Firstly, the pitch and depth of the corrugations and the seam 20 of the coupler band 16 will be the same as that of culvert pipe sections 12. Secondly, the helix angles of the ridges and valleys of the corrugations on the coupler 16 and culvert sections 12 will also be the same. Finally, the size of opening 17 of the coupler 16 will correspond to the opening 14 of the pipe sections 12. The net result will be that the coupler band 16 will fully approximate the overall configuration and contours of the culvert sections with which it is used.

After formation of a coupler band 16 as described above, it is then expanded sufficiently by the clamping device 22 described more fully hereinbelow so as to easily slip over and about the opposing ends of a pair of culvert pipe sections 12. After the band is disposed about the culvert pipe sections 12 in the exact positions desired, it is next collapsed or restored as nearly as possible to its original shape by clamping means 22. During this collapsing, the coupler band is, among other things, drawn into tight interlocking, lapping engagement and soil-proof relation with the opposing and enclosed culvert pipe sections 12.

Whereas in prior art couplers or bands the existence of helically disposed seams and corrugations in the culvert sections being joined presented serious obstacles to obtaining proper interlocking or a tight fit between the coupler and the culvert sections, the existence of such a seam has been turned to an advantage in the culvert coupling arrangement proposed by the instant invention, as will be now indicated. With reference particularly to FIG. 2, it will be observed that the seam 18 that can be employed and made up of interfitting and interlocked parts is what is commonly known in the trade as a "Pittsburg Lock Seam" of the helical type. In this seam, one of the pipe edges 26 is turned back upon itself to form a U-shaped edge, while the other edge 28 is similarly reversed and the two edges then interfitted with each other in the manner shown. The depiction of the seam 18 in FIG. 2 is somewhat exaggerated for the purposes of illustration in that in the final seam used in commercially acceptable pipe, from which bands 16 can be made, the various parts of the seam will be compressed or drawn together as closely as is practical.

In certain instances and as also indicated in FIG. 2, it may be desirable during manufacture, depending on the fluids conveyed by sections 12, to apply an appropriate plastic or bituminous type sealant material to pipe edges 26 and 28 prior to the interlocking thereof, in order to render seam 18 substantially leak-proof. Further, a thin boot 24 of appropriate synthetic plastic or rubber sealant material can be applied to the ends of the culvert sections 12 to be joined by a coupler 16 prior to application of the coupler to the ends of adjacent sections 12 in the manner indicated in FIG. 1A. Finally, fluid carrying specifications for a given culvert or pipe system may require that the interior of the coupler and pipe sections 12 be lined with an appropriate plastic coating or lining 68 and 68'.

Figure 3:
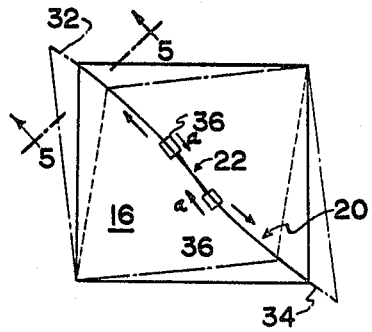
FIG. 3 is an enlarged diagrammatic plan view of the coupler band of the instant invention when taken generally along line 3—3 of FIG. 1 and illustrates how the band becomes distorted when it is collapsed.
Figure 4:
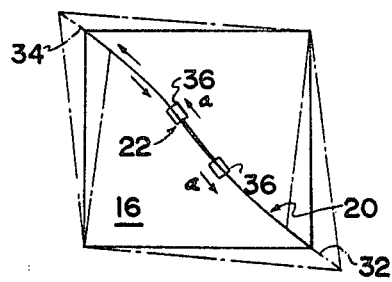
FIG. 4 is another enlarged diagrammatic plan view similar to FIG. 3 of the coupler band of FIG. 1 and illustrates the distorted shape of the band when it is expanded.
Figure 4A:
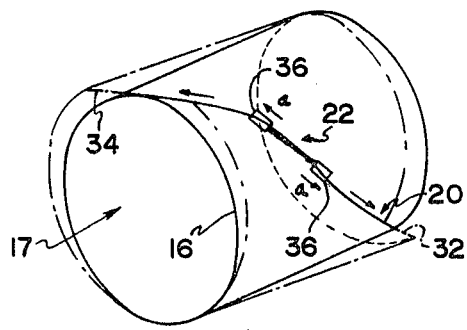
FIG. 4A is a perspective view of the coupler as shown in FIG. 4.

As indicated in FIG. 5, the interlocked side edges 32 and 34 of seam 20 of the split band 16 are interlocked in the same general fashion as the seam edges 26 and 28 of the seam 18 in each of the culvert sections 12 whereby, upon the proper application of opposing pulling forces to the respective edges 32 and 34, these edges can become displaced or shifted longitudinally relative to one another without, at the same time, becoming fully disengaged. When this displacement occurs, as indicated in FIGS. 3-4A, the normal cylindrical configuration of the coupler band 16 is altered or distorted in that the extremities of the seam edges 32 and 34 of the seam 20 at both longitudinal ends of the coupler 16 are displaced from their normal positions of rest at the same time the diameter of the opening 17 of the coupler changes due to the resultant expansion or contraction of opening 17 by the shifting of the seam edges 32 and 34 relative to one another by selected operation of the clamping device 22.

The means for controlling the relative movement or shifting of the seam edges 32 and 34 of the band in the desired manner can be any suitable adjustable clamping device, such as a toggle clamp, turnbuckle, etc. so long as one seam edge 32 or 34 can be longitudinally shifted relative to the other in either direction while retaining substantially intact the interlock therebetween. For the purposes of illustration, a turnbuckle device 22 is shown. It is attached to the opposing edges 32 and 34 of the coupler in an improved fashion whereby the turnbuckle illustrated at the most preferably crosses and intersects the longitudinal axis of coupler band seam 20 at a relatively small interior angle.

This turnbuckle device 22 generally comprises a pair of spaced lugs 36 and a bolt 38 extending between and connected thereto. Since the lugs 36 are substantially identical in structure, a description of one will suffice for both. Each lug 36 is preferably constructed of a series of interconnected flat metal plate sections, such as bottom plate 40, a pair of upstanding spaced and parallel plates 42 welded at the bottoms thereof to a plate 40 as shown and interconnected and welded at the tops thereof to a top cover plate 44. The oppositely facing inner surfaces of plates 42 and the oppositely facing inner surfaces of the cover plate 44 and the base plate 40 define a transverse slot 43. Plates 42 and 44 can be further reinforced if desired by gusset plates 46 and the shorter sides of each reinforcing plate 46 are affixed to plates 42 and 40 in the manner shown in FIG. 7. Each of the plates 42 is provided with an opening 48 indicated by dotted lines in FIGS. 6 and 7 and the opening 48 in one such plate is aligned with the corresponding opening in the other plate.

The lugs 36 can be advantageously welded or otherwise affixed to the outer surface of the coupler 16 on opposite sides of the seam 20 in spaced and aligned relation to each other. The centers of the openings 48 in the plates 42 of the opposed lugs 36 are aligned with the common longitudinal axis 50 for turnbuckle 22. In affixing the lugs 36 on either side of the seam 20 by fillet welds generally indicated at 49 in FIG. 6, the common longitudinal axis 50 of the affixed lugs 36 is preferably disposed slightly askew and at a slight acute interior angle relative to the band seam 20. Thus, as indicated particularly in FIG. 6, if one were to consider the longitudinal axis 51 of coupler band seam 20 as being projected in a plane tangential to the curved coupler band's periphery at the point P of its intersection with axis 50 of the turnbuckle device 22 and with the axis 50 of the turnbuckle device also being located in the same plane, the angle X, which can be considered as the interior angle at this point P of intersection, would be very small and preferably on the order of not more than about 5°. On the other hand, and as indicated somewhat in FIGS. 6 and 7, the lugs 36 can be arranged in any suitable fashion such as having them both lean forward of their points of attachment whereby the axis 50 of device 22 and the axis 51 of the seam 20 are aligned as closely as possible in a common plane such that at the most the axes 50 and 51 intersect at a relatively small angle in such plane at point P.

The bolt 38 extending between and interconnected to the affixed lugs 36 includes a threaded shank portion 52 and an enlarged head portion 54 at one end. The shank portion 52 is of a diameter somewhat smaller than the diameter of the openings 48 of lugs 36 and of a length capable of extending between and through all the openings 48 in both lugs 36.

In order to assemble the bolt 38 with the various lugs 36, a cylindrical collar 56 is secured to the shank portion 52 of the bolt adjacent the head end 54 thereof. This collar is disposed in the slot 43 of the right-hand lug 46 as viewed in FIGS. 6 and 7. The collar 56 has an opening 57 of a size slightly larger than the shank portion 52 so as to freely and non-threadedly receive the shank portion 52. The collar 56 should also be of a small enough overall size whereby it can be freely inserted into the slot 43, and its opening 57 aligned with the openings 48 in the right-hand lug 36.

After locking bolt 38 to the right-hand lug 36, by means of collar 56, the bolt is next inserted in the openings 48 of the left-hand lug 36 and locked thereto by threadedly engaging the threaded opening 59 of the nut 58 provided with hexagonal surfaces 64 and disposed in the slot 43 of the left-hand lug as viewed in FIGS. 6 and 7.

The loosely assembled collar 56 in the right-hand lug 36 in FIGS. 6 and 7 is fixedly secured to the shank portion 52 of the cap screw or bolt 38 by means of a suitable pin 62 or the like inserted in the opening 58 in collar 56 and opening 60 in the shank portion 52 of bolt 38. Upon affixation of lugs 36 and bolt 38 in the manner described, rotation of bolt 38 clockwise or counter-clockwise will produce movements of the affixed lugs 36 toward or away from each other depending on which way the bolt is rotated.

Inasmuch as the lugs 36 are secured to portions of the band 16 on opposite sides of seam 20 and with opposing seam edges 32 and 34 being interlocked with each other, the movements of lugs 36 toward or away from each other will effect a corresponding longitudinal shifting or displacement of the interlocked edges 32 and 34 of the coupler band 16. It is to be observed here that this interlocking of seam edges 32 and 34 is used to advantage during this longitudinal shifting or displacement of these edges relative to one another in the manner indicated by the different arrows in FIGS. 3–4A of the drawings wherein the arrows marked *a* indicate the direction of movement of the lugs 36, in that the interlocked edges remain interlocked during this displacement. In a sense, each seamed edge advantageously acts as a track for the other seam edge during their relative shifting movements. The relative shifting of parts is best illustrated in FIGS. 3 through 4A. In these figures, the solid lines are used to outline the peripheral portions and seam edges 32 and 34 of the band 16 when these peripheral portions and seam edges are in their normal at rest and closed position. The dotted lines show the changes that occur in the extremities of the seam edges 32 and 34 and the peripheral portions of the band 16 when the band is collapsed or expanded.

Figure 3A:
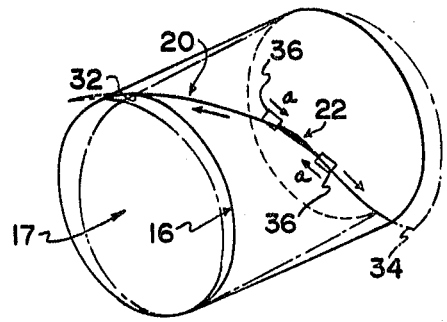
FIG. 3A is a perspective view of the coupler band as shown in FIG. 3.

As indicated in FIGS. 3 and 3A of the drawings, the closing of the turnbuckle device 22 produces a contraction in the size of the opening 17 of band 16 and a general outward distending of the opposing seam edges 32 and 34. Conversely, adjustment of the bolt 38 in a reverse direction or the opening thereof will cause a general inward shifting of the seam edges in the manner shown in FIGS. 4 and 4A and an expansion in the overall size of band 16. This latter adjustment is used to initially open the band for application of the band about the opposing ends of a pair of pipe sections 12.

From the above description, it is evident that rotation of the bolt 38 in either direction causes component forces to act in opposite directions along the length of the seam 20 which is generally arranged at an angle to the main axis of the band in order to cause relative movement of the interlocked edges 32 and 34 and the opening and closing thereof. Thus, the affixed adjustment device 22 in effect acts as a reversible wedge depending upon the direction of rotation of the bolt 38, in order to forcibly alter the configuration of the coupler 16 and to expand or contract the size of the opening 17 of the band 16 as the case may be.

In accordance with the teachings of the instant invention, the band 16 is preferably applied to opposing culvert section ends by first being expanded in the manner shown in FIGS. 4 and 4A by the turnbuckle device of 22 in order that it can be freely fitted over the adjoining culvert section ends 12. Then the coupler 16 is contracted by the turnbuckle device 22 in the manner shown in FIGS. 3 and 3A so as to bring it into full mating surface-to-surface engagement along its entire length with the adjoining outer surfaces of the joined culvert sections 12. When the culvert sections 12 and coupler 16 are both helically corrugated and seamed in the same fashion as contemplated in a preferred embodiment of the invention, a substantially mirror image type fit will occur between coupler 16 and the culvert sections 12 which, along with the appropriate tightening of the turnbuckle device will produce, among other things, a soil-proof joint between the culvert sections.

The small interior angles X between the axis 50 of the turnbuckle device and the axis 51 of the helical seam as aforedescribed are just enough to allow the seam edges 32 and 34 to move and properly track during shifting without causing any serious distortion or collapse of the seam edges 32 and 34 whereby the seam edges could be bent out of shape during this shifting and tend to bind one with another.

Although the instant invention has been described as being particularly adaptable for use in joining together helically corrugated and helically seamed culvert pipe sections and coupler bands, the teaching of the invention can be applied equally well to non-helically corrugated pipe sections and coupler bands. For example, smooth walled pipe sections with or without helical seams and a smooth walled coupler band provided with the advantageous features of the band 16, except for the helical corrugations thereof, can be joined together in the same general fashion contemplated by the instant invention. The invention is further applicable to situations wherein the culvert pipe sections 12 have a somewhat elliptical cross-sectional configuration rather than a true circular cross-sectional configuration. It is to be noted that in instances where the coupler band 16 and culvert pipe sections 12 are all helically corrugated and seamed with substantially the same helical corrugations and seams that the opposing corrugations on the band 16 and culvert pipe sections 12 can in effect advantageously serve as opposing matching screw threads for making minute adjustments of one culvert section relative to the other while both are enclosed within the band 16 and prior to the time the band 16 is fully collapsed about both pipe sections 12.

Advantageous embodiments of the invention have been shown and described.

What is claimed is:

1. In a pipe joint assembly the combination of a pair of opposed pipe sections, a split coupler band encompassing the opposing ends of said pipe sections and means for drawing said coupler band tightly about the opposing ends of each of said pipe sections; said means comprising longitudinally interlocked yet longitudinally displaceable seam edges forming a seam on the coupler band, said seam having a longitudinal axis, and clamping means operable to cause the longitudinal displacement and shifting of the seam edges relative to each other so as to alternately effect an expansion and contraction of the coupler band while retaining the interlock between said seam edges substantially intact, said clamping band having a longitudinal axis, said clamping means including lug-type elements fixedly attached to said band and disposed on opposing sides of the coupler band seam such that the longitudinal axis of the clamping means crosses and intersects the longitudinal axis of the coupler band seam at a relatively small interior angle and means connected to said lug-type elements for alternately moving said lug-type elements away from and drawing said lug-type elements toward each other and for holding said lug-type elements at selected positions relative to each other.

2. A joint assembly as set forth in claim 1 wherein the pipe sections and coupler band all have fully matching helical corrugations.

3. A joint assembly as set forth in claim 1 wherein the pipe sections and coupler band all have matching helical seams.

4. A joint assembly as set forth in claim 1 wherein a boot of a resilient sealing material is interposed between said coupler band and the pipe sections disposed within said coupler band.

5. In a pipe joint assembly the combination of a pair of opposed helically corrugated and helically seamed culvert pipe sections, a split helically corrugated and helically seamed coupler band encompassing the opposing ends of said culvert pipe sections, said coupler band and said culvert pipe sections having matching helical corrugations of substantially the same pitch depth and direction, means for drawing said coupler band tightly about the opposing ends of the culvert pipe sections, said means comprising longitudinally overlapped and interlocked yet longitudinally displaceable seam edges forming the helical seam on the coupler band, said seam having a longitudinal axis clamping means operable to cause the longitudinal displacement and shifting of the seam edges relative to one another so as to alternately effect an expansion and contraction of the coupler band while retaining the interlock between said seam edges substantially intact, said clamping band having a longitudinal axis, said clamping means including lug-type elements fixedly mounted on the band and disposed on opposed sides of the band seam with the longitudinal axis of said clamping means at the most crossing and intersecting the longitudinal axis of the coupler band seam at a relatively small interior angle and means connected to said lug-type elements for alternately moving said lug-type elements toward and away from each other.

6. A joint assembly as set forth in claim 5 wherein the said interior angle is not more than about 5° when measured at the intersection of the longitudinal axis of the clamping means and the longitudinal axis of the coupler band seam and with both of the axes being projected in the same plane.

7. A joint assembly as set forth in claim 5 wherein a boot of a resilient sealing material is interposed between said coupler band and the pipe sections disposed within said coupler band.

8. A corrugated split coupler band for splicing a pair of pipe elements and the like together, said band being provided with fully interlocked yet longitudinally displaceable seam edges which form a seam on the band, said seam having a longitudinal clamping means operable to cause the longitudinal displacement and shifting of the seam edges relative to each other so as to alternately effect an expansion and contraction of the coupler band while retaining the interlock between said seam edges substantially intact, said clamping band having a longitudinal axis, said clamping means including lug-type elements fixedly mounted on said band and disposed on opposing sides of the band seam with the longitudinal axis of said clamping means crossing and intersecting the longitudinal axis of the coupler band seam at a relatively small interior angle and means connected to said lug-type elements for alternately moving said lug-type elements toward and away from each other.

9. A coupler band as set forth in claim 8 wherein the coupler band is provided with a helically wound seam.

10. A coupler band as set forth in claim 8 wherein the band is provided with helically wound corrugations.

References Cited

UNITED STATES PATENTS

| | | | |
|---|---|---|---|
| 735,644 | 8/1903 | Wirtz | 285—424 X |
| 1,098,526 | 6/1914 | Prendergast | 254—98 X |
| 1,547,106 | 7/1925 | Dutcher | 285—369 X |
| 1,566,953 | 12/1925 | Becker | 285—373 X |
| 1,906,010 | 4/1933 | Naylor | 138—154 X |
| 2,756,778 | 7/1956 | Curtis | 285—424 X |
| 3,298,721 | 1/1967 | Wiley | 285—424 X |

CARL W. TOMLIN, Primary Examiner

DAVE W. AROLA, Assistant Examiner

U.S. Cl. X.R.

24—279; 138—154; 285—55, 424

UNITED STATES PATENT OFFICE
CERTIFICATE OF CORRECTION

Patent No. 3,455,584                                  July 15, 1969

Henry G. Henrickson

It is certified that error appears in the above identified patent and that said Letters Patent are hereby corrected as shown below:

Column 2, line 43, "legnth" should read -- length --.
Column 8, line 1, "longitudinal clamping means" should read -- longitudinal axis, clamping means --.

Signed and sealed this 24th day of November 1970.

(SEAL)
Attest:

Edward M. Fletcher, Jr.

Attesting Officer

WILLIAM E. SCHUYLER, JR.

Commissioner of Patents